Jan. 31, 1933.  B. BURVENICK  1,896,028
NIPPLE ATTACHING MEANS AND METHOD
Filed May 24, 1930
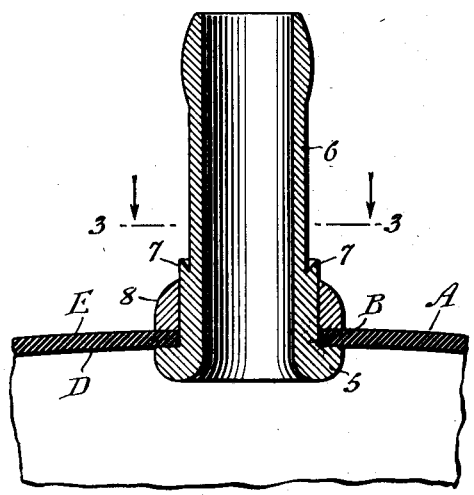
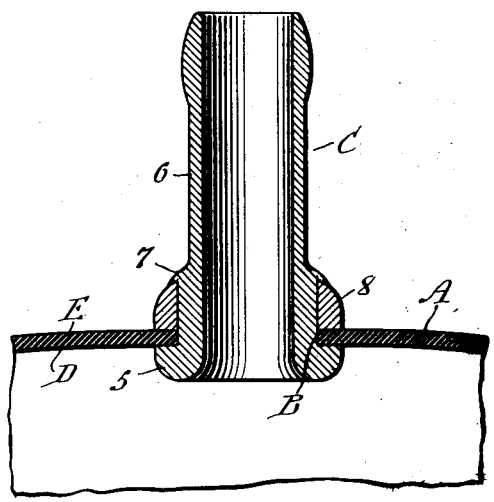
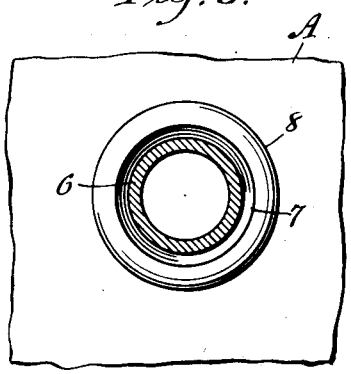
WITNESSES
INVENTOR
Benjamin Burvenick
BY
ATTORNEY Patented Jan. 31, 1933

1,896,028

UNITED STATES PATENT OFFICE

BENJAMIN BURVENICK, OF WOODHAVEN, NEW YORK, ASSIGNOR TO LALANCE & GROSJEAN MANUFACTURING COMPANY, OF WOODHAVEN, NEW YORK, A CORPORATION OF NEW YORK

NIPPLE ATTACHING MEANS AND METHOD

Application filed May 24, 1930. Serial No. 455,372.

This invention relates to an improved method of and means for connecting a nipple, nozzle or similar element with a vessel or container, and particularly where the vessel and nipple are constructed of a nickel chromium steel or similar metal alloys which are subject to oxidization resulting from soldering, welding brazing or other operations of this character.

Due to the nature of metal alloys of this class, oxidization results from soldering, welding, brazing or similar operations, thereby discoloring the vessel and nipple and requiring a subsequent resurfacing thereof to remove the discoloration. It is, therefore, the principal object of the present invention to provide a method of and means for connecting a nipple or similar element to a vessel which insures an effective and fluid tight joint while establishing a rigid connection therebetween.

Other objects of the invention reside in the simplicity of the method and means of attachment, the economy with which the same may be accomplished and the general efficiency derived therefrom.

With the above recited and other objects in view, reference is had to the following description and accompanying drawing, in which there is exhibited one example or embodiment of the invention, while the claims define the actual scope of the same.

In the drawing:

Figure 1 discloses a sectional view of the nipple in applied position immediately prior to the final step of securing the same in place.

Figure 2 is a similar vew illustrating the nipple in its fully applied and secured position.

Figure 3 is a cross sectional view taken approximately on the line 3—3 of Figure 1.

Figure 4 is a sectional view of the annulus constituting an element of the nipple anchoring means.

Referring to the drawing by characters of reference, A designates the wall of a vessel or other element which is provided with an aperture B. The nipple, designated generally by the reference character C, is of tubular construction and includes a peripheral head 5 at one end of its shank 6, the headed end of the shank being of greater diameter than the remainder of the shank and approximating the diameter of the opening B in the vessel A, it being understood, of course, that the diameter of the peripheral head 5 is greater than the diameter of the aperture B. At the juncture of the headed end of the shank with the remaining reduced portion, a peripheral shoulder 7 is formed, which shoulder initially is of the same diameter or slightly less than the headed end, whereby the nipple may be introduced through the aperture B in the vessel A. After the nipple has been introduced through the aperture, the peripheral head 5 engages the inner surface D of the vessel wall A, while a portion of the enlarged headed end protrudes beyond the exterior surface E of the vessel wall A to permit of the radial expansion of the shoulder 7 for setting up an axial thrust on the nipple to cause the head 5 to be tightly impinged against the inner surface D around the aperture. In practice, and preferably, a collar or annulus 8 is positioned over the protruding portion of the enlarged headed end of the nipple to bear against the outer surface E and to permit of the radial expansion and forcing of the shoulder 7 over the collar or annulus 8. The radial expansion and deformation of the shoulder 7 from the position illustrated in Figure 1 to that illustrated in Figure 2 is accomplished by a cold process which does not require the application of heat and, hence, eliminates discoloration.

The method of establishing a fluid tight connection between the nipple C and the apertured vessel wall A consists initially in fitting the nipple shank into the aperture B in the vessel with the headed end 5 in contact with the inner or one surface of the vessel and radially expanding the periphery of the nipple shank which protrudes beyond the outer or opposite surface of the vessel in order to set up an axial thrust on the nipple to cause the headed end to be tightly impinged against said inner or opposite surface around the aperture.

From the foregoing, it will thus be seen that a method of and means for establishing a fluid tight connection between an apertured vessel and headed nipple and for rigidly attaching the same together has been devised which permits of the use of chromium nickel steel or similar metal alloys without resorting to soldering, welding, brazing or other operations which cause oxidization and result in discoloring of the vessel and nipple, thereby requiring a resurfacing thereof to remove the discoloration.

What is climed is:

1. The combination with a nipple and an apertured vessel, of means for establishing a fluid tight connection therebetween including a peripheral head at one end of the nipple snugly fitted against one surface of the vessel with the shank of the nipple extending through and protruding beyond the other surface of the vessel, a collar snugly fitted over the protruding portion of the nipple and a deformable peripheral shoulder on the protruding portion of the nipple radially expanded against the collar to hold the nipple in place.

2. Means for attaching a nipple to the apertured portion of a vessel including a peripheral enlargement at one end of the nipple snugly fitted against one surface of the vessel around the apertured portion thereof, a collar fitted over that portion of the nipple protruding from the opposite surface of the vessel and a deformable peripheral shoulder on the nipple radially expanded over the collar.

3. A method of establishing a fluid tight connection between an apertured vessel and a headed nipple and for rigidly attaching the same together, consisting in fitting the nipple shank into the aperture in the vessel with the headed end in contact with one surface of the vessel, fitting a collar over the nipple shank which protrudes beyond the opposite surface of the vessel and then radially expanding the periphery of the nipple shank which protrudes beyond the collar against said collar to set up an axial thrust on the nipple for causing the headed end to be tightly impinged against said first mentioned surface of the vessel around the aperture.

4. The method of establishing a fluid-tight connection between an apertured vessel and a headed nipple of nickel-chromium-steel or similar alloy and for rigidly attaching the same together, comprising fitting the nipple shank into the aperture in the vessel with the headed end of the nipple in contact with one surface of the vessel, fitting a collar over the nipple shank which protrudes beyond the opposite surface of the vessel, bringing the collar into intimate contact with said opposite surface of the vessel, and then radially expanding peripherally a portion of the nipple shank which protrudes beyond said opposite surface of the vessel and the fitted collar to set up an axial thrust on the nipple, whereby to cause the headed end of the nipple to be tightly impinged against the vessel and the collar to be secured in intimate contact with the vessel.

5. A vessel comprising an apertured body and a nipple of nickel-chromium steel or similar alloy rigidly secured thereto, said nipple including a peripheral head at one end of its shank of slightly greater diameter than the diameter of the aperture of the vessel, a peripherally enlarged shank portion at its one end adjoining the head, said nipple at its enlarged shank portion being adapted to be introduced through the vessel and to protrude therefrom with the head in contact with the body of the vessel, said enlarged shank portion projecting beyond said vessel body, a collar approximately as thick as the length of the projecting portion of the enlarged shank portion and snugly fitted thereover, and a substantially V-shaped deformable peripheral shoulder at the end of the projecting portion of the enlarged shank portion radially expanded against the collar to impinge the collar and the head of the nipple into close contact with the body of the vessel to hold the nipple in fixed liquid-tight position with respect to the vessel body.

Signed at Woodhaven, L. I., in the county of Queens and State of New York this 17th day of May, 1930.

BENJAMIN BURVENICK.